(12) United States Patent
Taguchi

(10) Patent No.: US 7,344,017 B1
(45) Date of Patent: Mar. 18, 2008

(54) THREE AXIS DRIVE APPARATUS

(75) Inventor: Toshifumi Taguchi, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/642,848

(22) Filed: Dec. 21, 2006

(30) Foreign Application Priority Data

Sep. 7, 2006 (JP) ............................ P.2006-242536

(51) Int. Cl.
*B65G 15/58* (2006.01)

(52) U.S. Cl. ............................... 198/468.6; 198/468.01

(58) Field of Classification Search ............ 198/343.1, 198/343.2, 465.1, 468.01, 468.6, 468.8, 468.9; 901/7, 16; 414/749.1
See application file for complete search history.

(56) References Cited

U.S. PATENT DOCUMENTS

| | | | | |
|---|---|---|---|---|
| 4,988,261 A | * | 1/1991 | Blatt ........................ | 414/749.1 |
| 5,476,358 A | * | 12/1995 | Costa ....................... | 414/749.1 |
| 5,611,248 A | * | 3/1997 | Peltier .......................... | 901/21 |
| 5,738,203 A | * | 4/1998 | Crorey ..................... | 198/468.6 |
| 6,220,813 B1 | * | 4/2001 | Launiere .................. | 414/749.1 |
| 6,386,354 B1 | * | 5/2002 | Crorey ..................... | 198/468.6 |
| 7,165,665 B2 | * | 1/2007 | Casper et al. ............. | 198/346.3 |

FOREIGN PATENT DOCUMENTS

| | | |
|---|---|---|
| JP | 07-178683 A | 7/1995 |
| JP | 2000-009741 A | 1/2000 |
| JP | 2000-108072 A | 4/2000 |
| JP | 2005-014161 A | 1/2005 |

* cited by examiner

*Primary Examiner*—James R. Bidwell
(74) *Attorney, Agent, or Firm*—Sughrue Mion, PLLC

(57) ABSTRACT

A pulley drive mechanism 26 for driving a second pulley 23 includes: a spline shaft 27 rotated integrally with the second pulley 23, for supporting the second pulley so that the second pulley can be moved in the direction of Y-axis in the drawing; a third pulley 28 arranged at one end portion of the spline shaft 27; and a third belt drive mechanism 29 for driving the spline shaft 27 through the third pulley 28.

7 Claims, 9 Drawing Sheets

THREE AXIS DRIVE APPARATUS

BACKGROUND OF THE INVENTION

1. Field of the Invention

The present invention relates to a three axis drive apparatus used for an automatic analyzer, an electronic parts mounting device, various processing machines and a conveying device.

2. Description of Related Art

As an example, in an automatic analyzer for analyzing a specimen of blood or urine which has been collected into a reaction container such as a well plate, it is necessary to conduct positioning by moving a distribution nozzle, which distributes liquid such as chemical into a reaction container, in three directions of X-axis, Y-axis and Z-axis.

Conventionally a positioning device which determines position of the distribution nozzle in the three directions of X-axis, Y-axis and Z-axis has an X-direction positioning mechanism for positioning in X-axis direction, a Y-direction positioning mechanism for positioning in Y-axis direction and a Z-direction positioning mechanism for positioning in Z-axis direction. The distribution nozzle is positioned at a predetermined position by operating these positioning mechanisms.

However, in the conventional device, a positioning mechanism for moving the distribution nozzle in the three axial directions is formed out of a combination of a linear guide with a ball screw. Therefore, at least two drive motors in the three drive motors for driving the ball screws are moved integrally with the distribution nozzle. Therefore, when the distribution nozzle is moved in the three axial directions, a Cable Bear (registered trademark in Japan) for protecting an electric power cable connected to the drive motor is dragged. Therefore, noise and dust are generated. Since at least two drive motors in the three drive motors are mounted on a movable portion of the mechanism portion, a weight of the movable portion is increased and it is difficult to move a member to be driven such as a distribution nozzle in the three axial directions at high speed.

SUMMARY OF THE INVENTION

The present invention has been accomplished to solve the above problems. An object of the present invention is to provide a three axis drive apparatus capable of suppressing a generation of noise and dust from the Cable Bear.

In order to accomplish the above object, according to a first aspect of the invention, there is provided a three axis drive apparatus (1) for driving a driven member in first (X-direction), second (Y-direction) and third (Z-direction) directions perpendicular to each other, comprising:

a base (2, 101) comprising a first support portion (50, 60, 105) fixed thereon;

a first guide mechanism comprising:
a first guide member (4, 36, 121a) supported by the first support portion; and
a first slider (5, 121b, 121c) guided by the first guide member in the first direction;

a second guide mechanism comprising:
a second guide member (3a, 131a) extending in the second direction from the first slider; and
a second slider (3b, 131b) guided by the second guide member in the second direction;

a third guide mechanism that is provided on the second slider and guides the driven member to the third direction;

a first belt drive mechanism comprising:

a first slider drive transmission belt (8, 107) that slides the first slider; and
a first motor (11, 113) that drives the first slider drive transmission belt through a plurality of first pulleys (9, 10, 108a, 108b);

a second belt drive mechanism comprising:
a second slider drive transmission belt (14, 109) that slides the second slider; and
a second motor (20, 114) that drives the second slider drive transmission belt through a plurality of second pulleys (15, 16, 17, 18, 19, 110a, 110b, 110c, 110d, 110e); and a driven member drive mechanism comprising:
at least one of driven member drive transmission belt (25, 30, 111) that slides the driven member; and
a third motor (35, 115) that drives the driven member in the third direction through a plurality of driven member pulleys (22, 23, 28, 31, 32, 33, 34, 112a, 112b, 112c, 112d 112e, 112f, 112h, 112g), wherein the first pulleys, at least one of the second pulleys, at least one of the driven member pulleys, the first motor, the second motor and the third motor are fixed on the first support portion.

According to a second aspect of the invention, as set forth in the first aspect of the invention, it is preferable that the second belt drive mechanism further comprises three second pulleys that are supported on the first slider and draws a part of the second belt along with second direction.

According to a third aspect of the invention, as set forth in the first aspect of the invention, it is preferable that the third drive mechanism further comprises:

a spline shaft that is supported on the first slider so as to extend in the second direction and is rotated by at least one of the third transmission belt;

a pair of third pulleys that is rotatably driven by the spline shaft and provided so as to be movable in an axial direction of the spline shaft;

a secondary driven member drive transmission belt that moves the driven member in the third direction by the pair of the third pulleys.

According to a fourth aspect of the invention, as set forth in the first aspect of the invention, it is preferable that the driven member drive mechanism comprises:

a feed screw shaft supported on the second slider so as to extend in the third direction and rotatably driven by the driven member drive transmission belt;

a nut that is connected to the driven member, is screwed to the feed screw shaft and is moved in the third direction by rotation of the feed screw shaft.

According to a fifth aspect of the invention, as set forth in the fourth aspect of the invention, it is preferable that the driven member drive mechanism comprises:

a second direction drawing pulley that is supported on the first slider and draws a part of the second slider drive transmission belt in the second direction;

three first direction drawing pulleys that are supported on the second slider and draw a part of the second slider drive transmission belt in the second direction which is drawn in the second direction by the second direction drawing pulley, wherein one of the first direction drawing pulley, which is engaged with an end part of the second slider drive transmission belt drawn in the first direction, is fixed on the feed screw shaft.

According to a sixth aspect of the invention, as set forth in the fourth aspect of the invention, it is preferable that the driven member drive mechanism comprises:

a third slider comprising a nut portion screwed on the feed screw shaft, a slider support member that supports the third slider so as to be movable in an axial direction of the feed screw shaft.

According to a seventh aspect of the invention, as set forth in the first aspect of the invention, it is preferable that the third guide mechanism comprising:

a screw shaft (143) rotated by the driven member drive transmission belt;

a movable body (146) engaged with the screw shaft directly or indirectly;

a guide rail (147) that is provided so as to be parallel to the screw shaft and guides the movable body in a longitudinal direction of the guide rail;

wherein the movable body is driven by the screw shaft and guided by the guide rail.

According to the invention, since the first pulleys, at least one of the second pulleys, at least one of the driven member pulleys, the first motor, the second motor and the third motor are fixed on the first support portion, when moving the driven member in one of the three directions, there are not any fears that Cable Bear is dragged. Accordingly, there are no fears that the noise or the dust is generated.

Furthermore, the first motor, second motor and third motor are mounted on the first support portion, the second guide mechanism or the driven member drive mechanism can be lightweight, thus, the driven member can be moved quickly.

DETAILED DESCRIPTION OF EXEMPLARY EMBODIMENTS OF THE INVENTION EMBODIMENTS

First Embodiment

Figure 1:
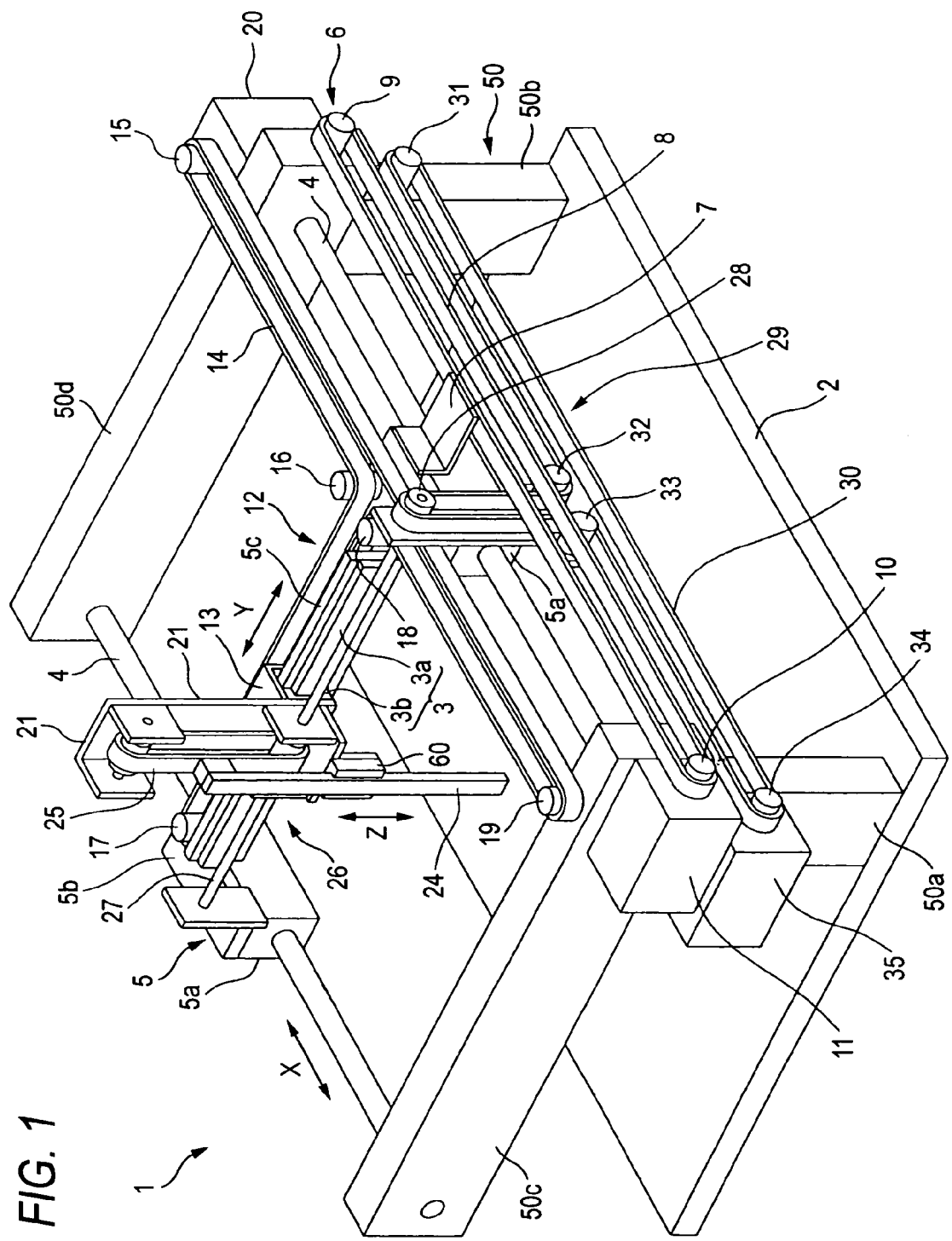
FIG. 1 is a perspective view showing an outline of the structure of the three axis drive apparatus of the first embodiment of the present invention.
Figure 2:
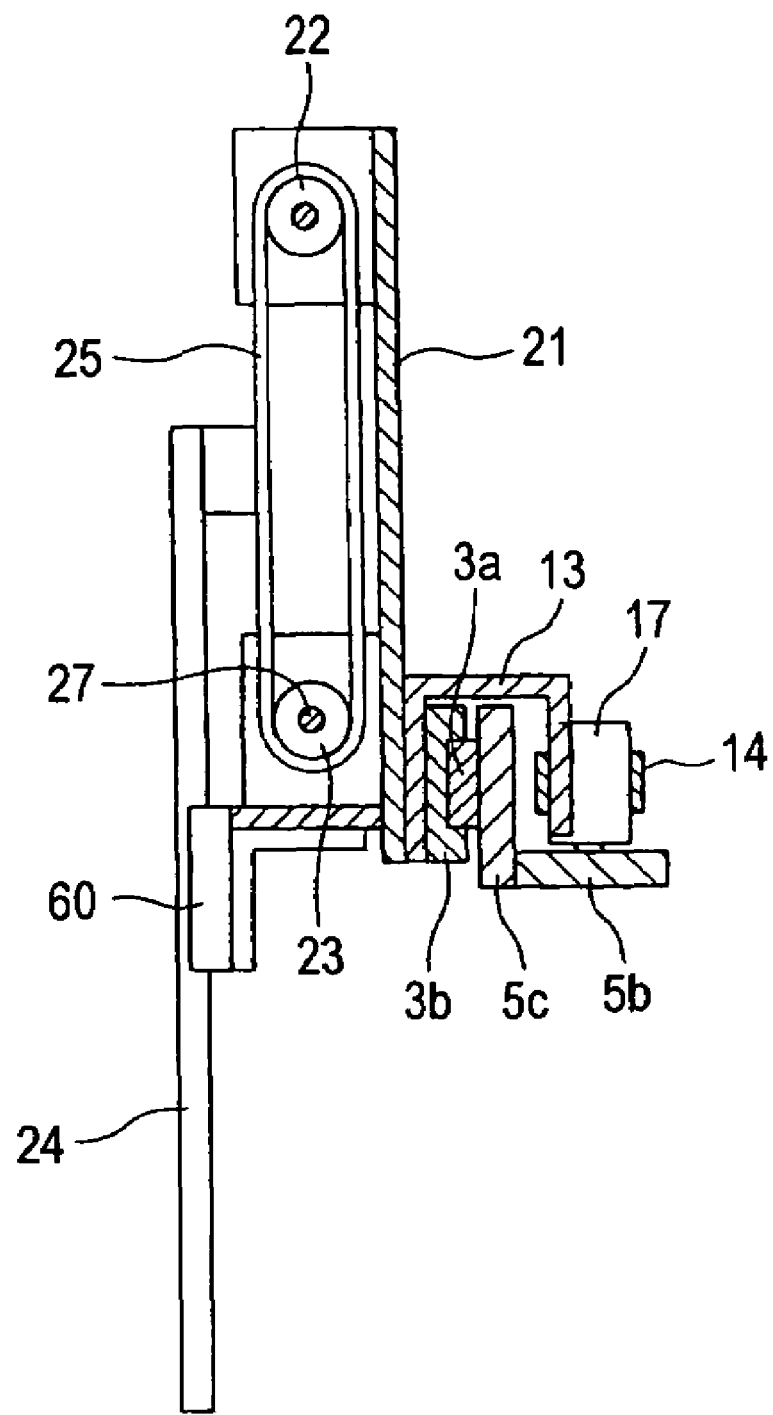
FIG. 2 is a sectional view showing a portion of the three axis drive apparatus shown in FIG. 1.

Referring to the drawings, an embodiment of the present invention will be explained below.

FIG. 1 is a view showing an overall arrangement of the three axis drive apparatus of the first embodiment of the present invention.

As shown in the drawing, the three axis drive apparatus 1 of the first embodiment of the present invention is provided with a plate-shaped base 2. On the base 2, an X-direction support portion 50 is provided. The X-direction support portion 50 is provided with two columns 50a, 50b and two beams 50c 50d, of which ends are fixed to the columns 50a, 50b. Two beams 50c, 50d supports two guide rods 4. Above this plate-shaped base 2, a linear guide 3 is provided as a second guide mechanism. This linear guide 3 is used for moving a driven member 24 in the second axial direction (the direction of Y-axis) perpendicular to the first axial direction (the direction of X-axis). This guide rail 3a of the linear guide 3 is fixed to the guide rail support 5 so that an extending direction of the guide rail 3a can be laid along the direction of Y-axis (the second axial direction) in the drawing.

The X-axis slider (first slider) 5 includes a pair of blocks 5a respectively internally engaged with a substantially cylindrical bearing (not shown) guided by two guide rods (first guide member) 4 arranged above the base 2; a plate 5b provided between the pair of blocks 5a; and a rail support member 5c fixed to the plate 5b. The guide rail 3a is fixed to the rail support member 5c.

The first guide mechanism includes: a pair of guide rods 4; and at least one bearing (not shown). Due to the above structure, the guide rail support 5 (Y-direction support portion) is supported so as to be moved in the direction of X-axis (the first axial direction). The guide rail support 5 and others compose the first movable portion.

The guide rail 3a of the linear guide (second guide member) 3 is driven in the direction of X-axis in the drawing by the first belt drive mechanism 6 through the guide rail support 5.

This first belt drive mechanism 6 includes: a belt attaching member 7 attached to the guide rail support 5, composing the first movable portion; a timing belt 8 (a first slider drive transmission belt) for driving the guide rail support 5 through the belt attaching member 7 in the direction of X-axis in the drawing; and a motor 11 (first motor) for driving this timing belt 8 through the pulleys 9, 10.

On the other hand, a slider (second slider) 3b of the linear guide 3 is driven in the direction of Y-axis in the drawing by the second belt drive mechanism 12.

This second belt drive mechanism 12 includes: a belt attaching member 13 attached to the slider 3b of the linear guide 3; a timing belt 14, which is a transmission belt, for driving the slider 3b through the attaching member 13 in the direction of Y-axis in the drawing; and a motor 20 (second motor) for driving this timing belt 14 through pulleys 15, 16, 17, 18, 19.

The three axis drive apparatus 1 of the first embodiment includes: a first pulley 22 pivotally supported by the slider 3b of the linear guide 3 through the bracket 21 composing the second movable portion together with the belt attaching member 13; a second pulley 23 arranged in parallel with the first pulley 22; a timing belt 25 which is a transmission belt for driving a driven member 24 in the third axial direction (the direction of Z-axis) perpendicular to the first and the second axial direction in cooperation with these pulleys 22, 23; and a pulley drive mechanism 26 (shown in FIG. 1) for driving the second pulley 23.

In this case, the pulley drive mechanism 26 includes: a spline shaft 27 rotated together with the second pulley 23, for supporting the second pulley 23 so that the second pulley 23 can be moved in the direction of Y-axis in the drawing; a third pulley 28 arranged at one end portion of this spline shaft 27; and a third belt drive mechanism 29 for driving the spline shaft 27 through the third pulley 28. The third belt drive mechanism 29 includes: a timing belt 30 which is a transmission belt for driving the third pulley 28; and a motor 35 for driving this timing belt 30 through the pulleys 31, 32, 33, 34.

In this structure, when the motor 35 of the third belt drive mechanism 29 is driven, the second pulley 23 is rotated integrally with the spline shaft 27. When the motor 20 of the second belt drive mechanism 12 is driven, the second pulley 23 is moved in the axial direction of the spline shaft 27 integrally with the slider 3*b*.

Accordingly, in the first embodiment described above, the pulley drive mechanism 26 for driving the second pulley 23 includes: a spline shaft 27 rotated integrally with the second pulley 23, for supporting the second pulley 23 so that the second pulley 23 can be moved in the direction of Y-axis (the second axial direction); a third pulley 28 arranged at one end portion of the spline shaft 27; and a third belt drive mechanism 29 for driving the spline shaft 27 through the third pulley 28.

Due to the above structure, the second pulley 23 can be rotated under the condition that the third belt drive mechanism 29 is fixed at a predetermined position. Accordingly, it is unnecessary to mount the pulley drive mechanism 26, which drives the second pulley 23, on the slider 3*b* of the linear guide 3. Further, a weight of the device can be reduced.

Second Embodiment

In this connection, it should be noted that the present invention is not limited to the above specific embodiment. For example, in the first embodiment described above, the first guide mechanism for supporting the guide rail support (the first movable portion) 5 for supporting the guide rail 3*a* of the linear guide is supported by the two guide rods 4 and the cylindrical bearing.

Figure 3:
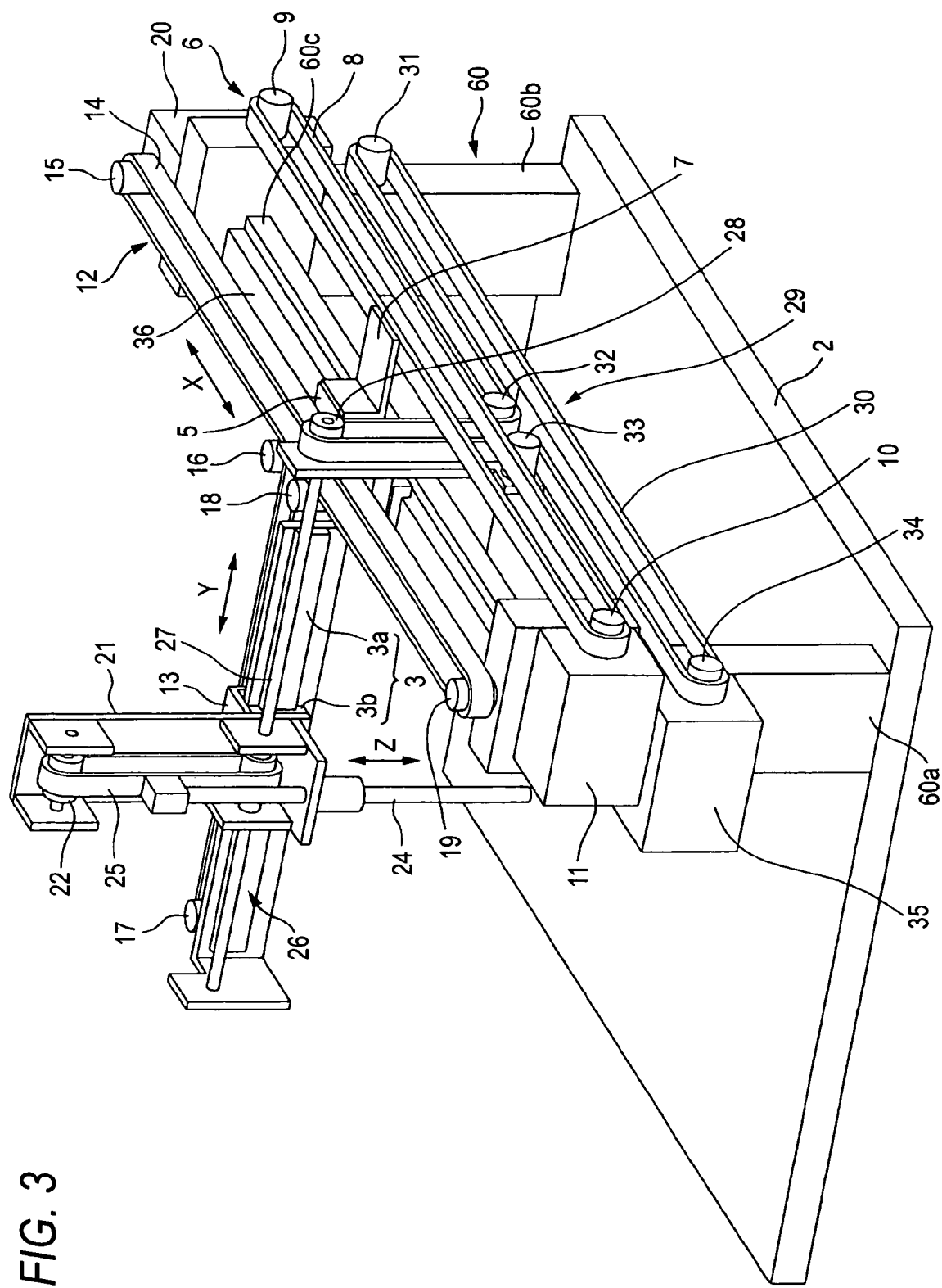
FIG. 3 is a perspective view showing an outline of the structure of the three axis drive apparatus of the second embodiment of the present invention.

However, as shown in a second embodiment illustrated in FIG. 3, it is possible that the guide rail support 5 also uses a linear guide and is supported by the guide rail 36 different from the guide rail 3*a* of the linear guide 3. An X-direction support portion 60 is provided on the base 2. The X-direction support portion is provided with columns 60*a*, 60*b* and beam 60*c* supported by the columns 60*a*, 60*b*. A guide rail 36 is provided on the beam 60*c*. Further, it is possible that the bearing to support the driven member is replaced with a substantially cylindrical bearing.

In the same manner, the second guide mechanism is not limited to the above guide mechanism, instead of the linear guide 3, for example, it is possible to employ a combination of the guide rod with the substantially cylindrical bearing. In any case, the guide mechanism is not limited to a rolling bearing but it is possible to use a sliding bearing. Alternatively, it is possible to use a non-contact type guide such as a static pressure guide.

Third Embodiment

Referring to FIGS. 4 to 10, a third embodiment of the present invention will be explained below.

Figure 4:
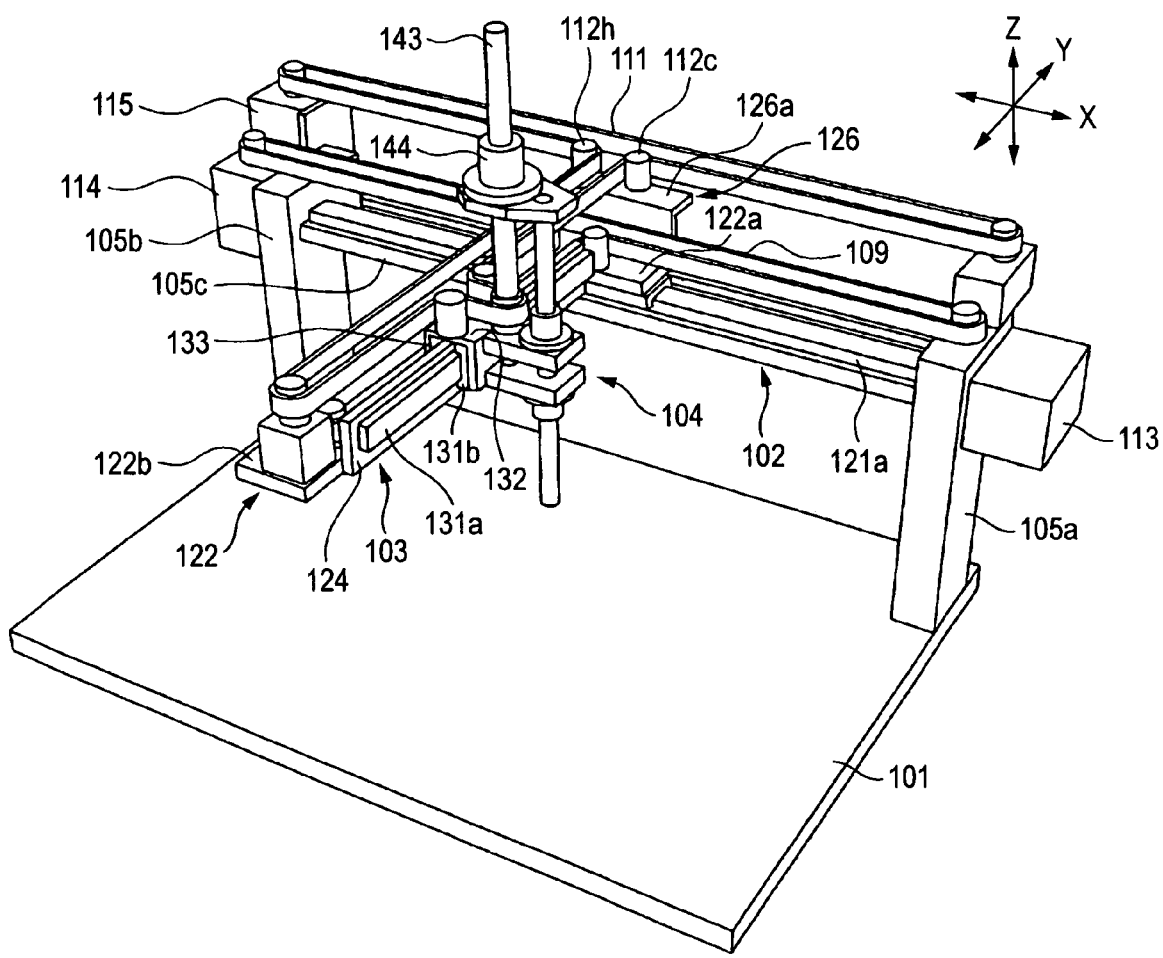
FIG. 4 is a perspective view showing an outline of the structure of the three axis drive unit of the third embodiment of the present invention.
Figure 5:
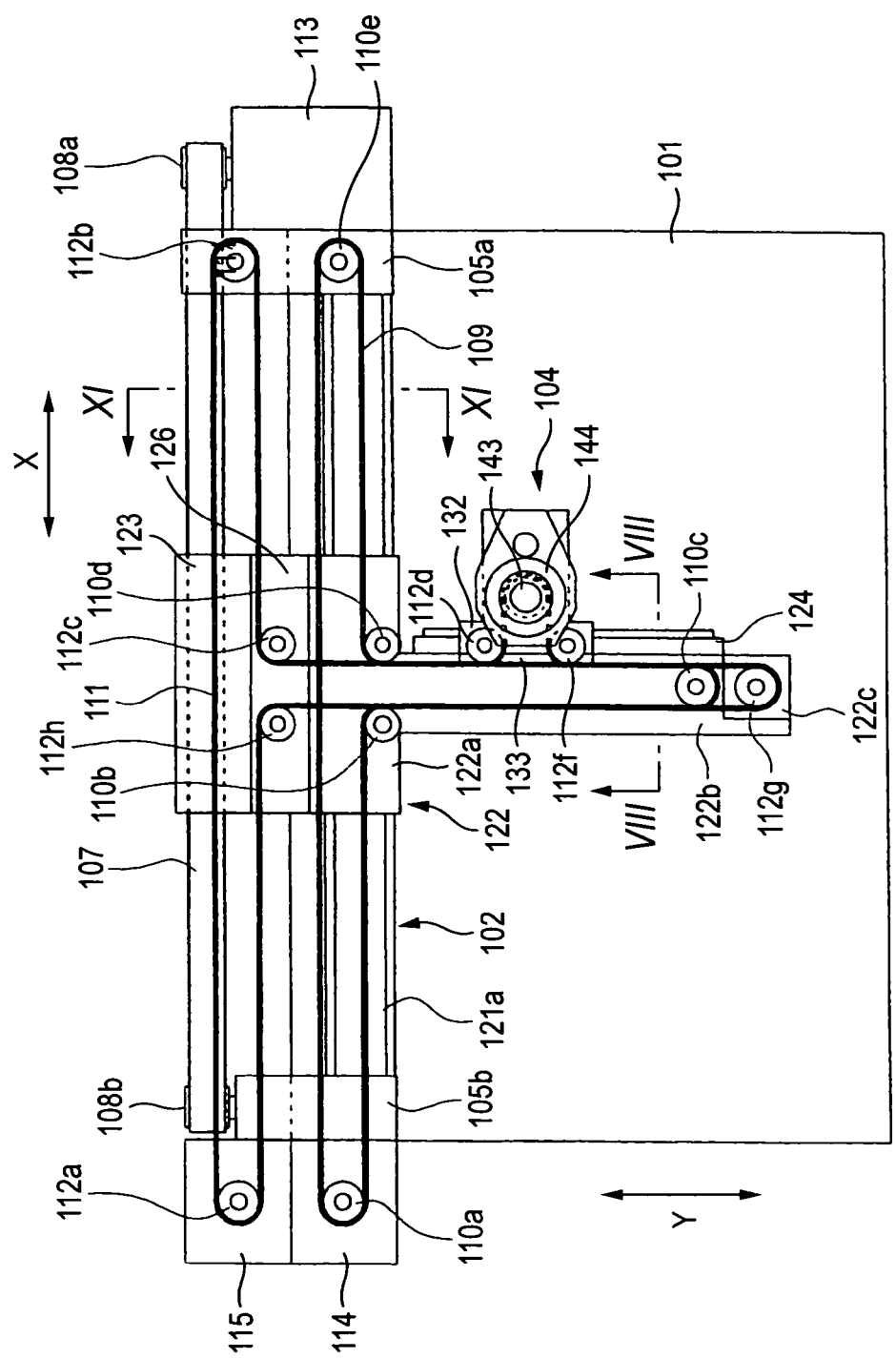
FIG. 5 is a plan view showing the three axis drive unit of the third embodiment of the present invention.
Figure 6:
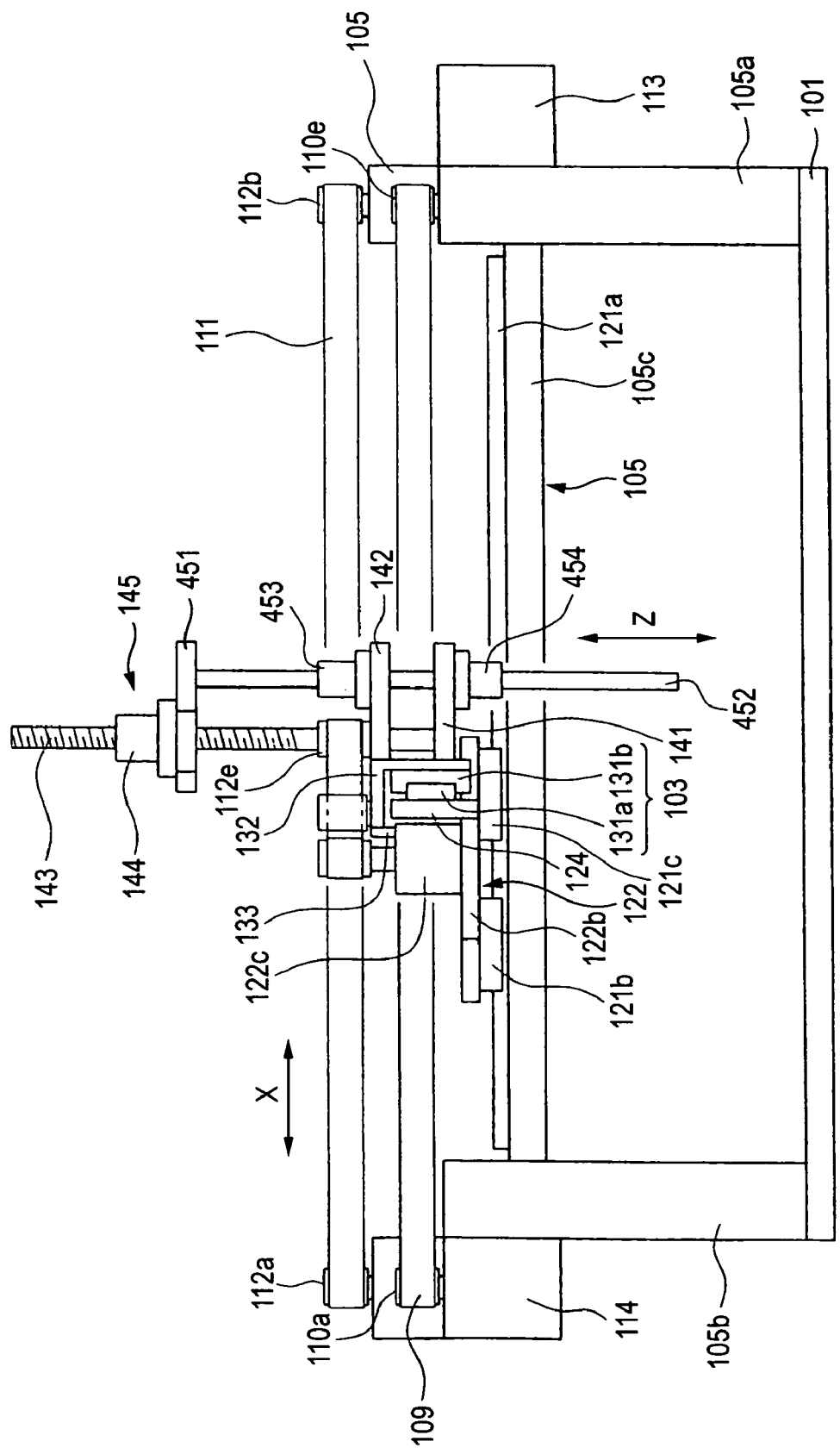
FIG. 6 is a front view showing the three axis drive unit of the third embodiment of the present invention.
Figure 7:
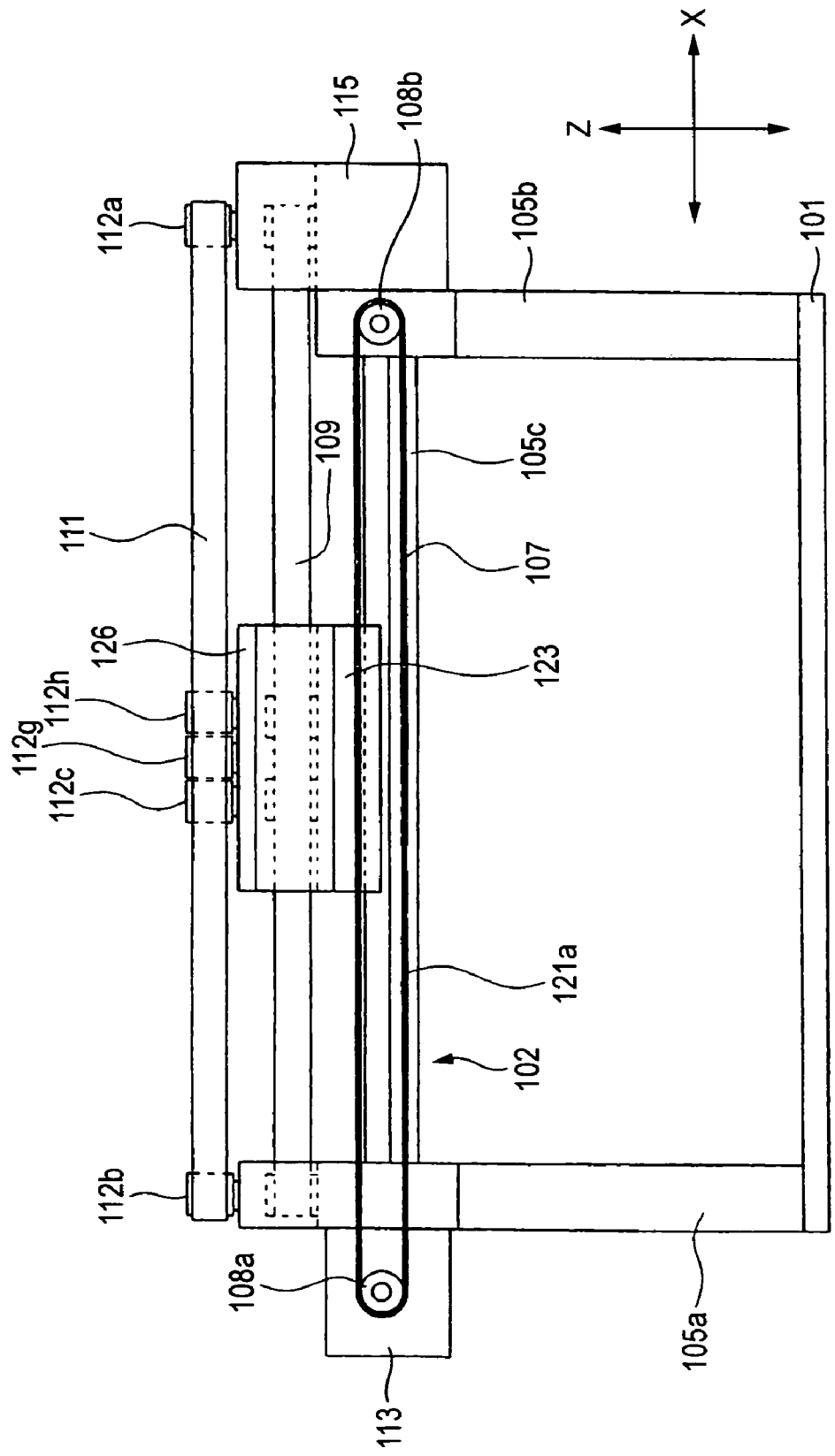
FIG. 7 is a rear view showing the three axis drive unit of the third embodiment of the present invention.
Figure 8:
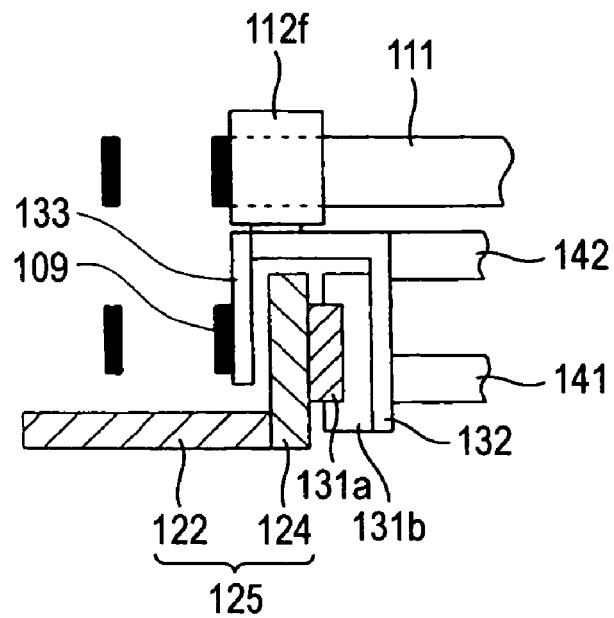
FIG. 8 is a sectional view taken on line VIII-VIII in FIG. 5.
Figure 9:
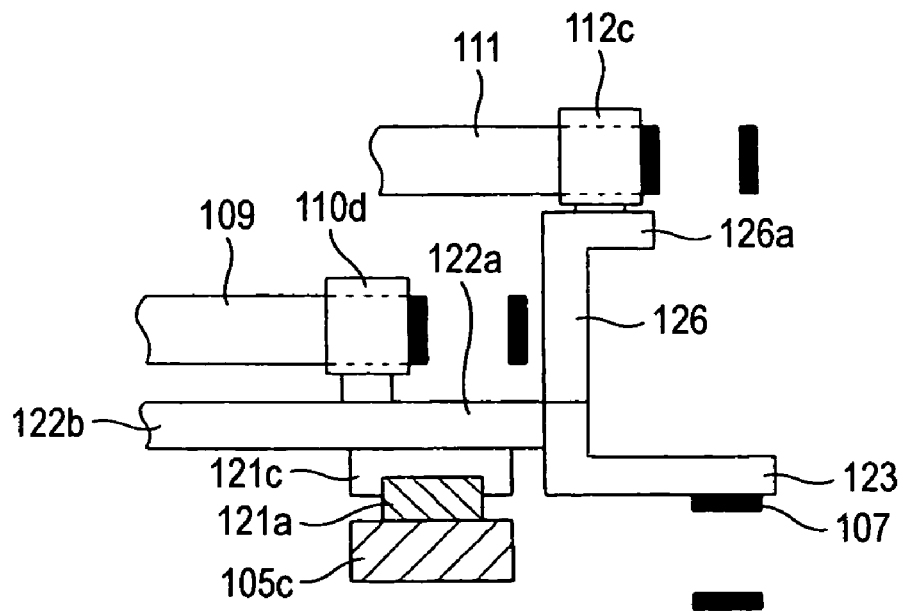
FIG. 9 is a sectional view taken on line IX-IX in FIG. 5.

FIG. 4 is a perspective view showing an outline of the structure of the three axis drive unit of the third embodiment of the present invention, FIG. 5 is a plan view showing the three axis drive unit of the third embodiment, FIG. 6 is a front view showing the three axis drive unit of the third embodiment, FIG. 7 is a rear view showing the three axis drive unit of the third embodiment, FIG. 8 is a sectional view taken on line VIII-VIII in FIG. 5, and FIG. 9 is a sectional view taken on line IX-IX in FIG. 5. The three axis drive unit of the third embodiment includes: a base 101, a first guide mechanism 102, a second guide mechanism 103 and a Z-direction positioning mechanism 104.

The first guide mechanism, which will be referred to as "an X-direction linear guide" hereinafter, includes: a guide rail 121*a* which is an X-direction guide member horizontally supported by support columns 105*a*, 105*b*, which are vertically arranged on an upper face portion of the base 101, and also supported by a beam member 105*c*, both end portions of which are fixed to upper end portions of both support columns 105*a*, 105*b*; and X-axis sliders (bearing blocks) 121*b*, 121*c* (shown in FIG. 6) guided by the guide rail 121*a* in the direction of X-axis. The support columns 105*a*, 105*b* and the beam member 105*c* compose an X-direction support portion 105 (shown in FIG. 6). To upper face portions of the X-axis sliders 121*b*, 121*c*, a base end portion 122*a* of the X-axis plate 122 described later is fixed. To a base end portion 122*a* of the X-axis plate 122, an X-axis belt attaching portion 123 (shown in FIGS. 5 and 9) is fixed. To an X-axis belt attaching member 123, a timing belt 107, which is a first slider drive transmission belt, is fixed. Due to the above structure, the X-axis sliders 121*b*, 121*c* are driven and slid by the timing belt 107.

The timing belt 107 has an inner circumferential face on which teeth are formed being meshed with teeth provided on outer circumferential faces of pulleys 108*a*, 108*b* (shown in FIG. 7) described later.

The X-axis plate 122 includes an extending portion 122*b* (shown in FIGS. 4 and 5) which extends from the base end portion 122*a* in the Y-direction. On a side of this extending portion 122*b* laid along the direction of Y-axis, a plate-shaped Y-axis rail support member 124 (shown in FIGS. 5 and 8) is fixed. The X-axis plate 122 and the Y-axis rail support member 124 compose a Y-axis support portion 125 (shown in FIG. 8).

The second guide mechanism 103, which will be referred to as "a Y-direction linear guide" hereinafter, includes: a guide rail 131*a* which is a Y-direction guide member fixed onto a side of the Y-axis rail support member 124; and a Y-axis slider 131*b* guided by the guide rail 131 in the direction of Y-axis. A Y-axis plate 132 described later is fixed to the Y-axis slider 131*b*. Further, a Y-axis belt attaching member 133 is fixed onto the Y-axis plate 132. A timing belt 109, which is a second slider drive transmission belt, is fixed to the Y-axis belt attaching member 133. Due to the above structure, the Y-axis slider 131*b* is driven and slid by the timing belt 109.

The timing belt 109 has an inner circumferential face on which teeth are formed being meshed with teeth provided on outer circumferential faces of pulleys 110*a*, 110*c*, 110*e* (shown in FIG. 5) described later.

The Z-axis positioning mechanism 104 includes: feed screw shaft support members 141, 142 (shown in FIG. 6) fixed to the Y-axis plate 132; and a feed screw shaft 143 perpendicularly, pivotally supported by the feed screw shaft support members 141, 142. The feed screw shaft 143 is driven and rotated by the timing belt 111 (the feed screw shaft drive transmission belt) through pulleys 112*a*, 112*b*, 112*c*, 112*d*, 112*e*, 112*f*, 112*g*, 112*h* (shown in FIG. 5, the pulley 112*e* is shown in FIG. 6) described later. On an inner circumferential face of the timing belt 111, teeth are provided which are meshed with the teeth provided on outer circumferential faces of the pulleys 112*a*, 112*b*, 112*e*, 112*g*. The Z-direction positioning mechanism 104 includes: a nut 144 screwed to the feed screw shaft 143; and a nut support mechanism portion 145 for supporting the nut 144 so that the nut 144 can be moved in the axial direction of the feed screw shaft 143.

Further, the nut support mechanism portion 145 of the Z-direction positioning mechanism 104 includes: a guide rod support plate 451 (shown in FIG. 6) fixed to the nut 144; a guide rod 452 perpendicularly supported by the guide rod support plate 451; and guide sleeves 453, 454 for guiding the guide rod 452 in the direction of Z-axis. These guide sleeves 453, 454 are fixed to the feed screw shaft support members 141, 142. An object to be positioned, which is the guide rod 452 itself, or an object fixed to a portion of the guide rod 452 such as a foreword end of the guide rod moved together with the guide rod, corresponds to a member to be driven.

The slider drive timing belt 107 is driven by the drive motor 113 through the pulleys 108*a*, 108*b*. The slider drive timing belt 109 is driven by the drive motor 114 through the pulleys 110*a*, 110*b*, 110*c*, 110*d*, 110*e*. The feed screw drive timing belt 111 is driven by the drive motor 115 through the pulleys 112*a*, 112*b*, 112*c*, 112*d*, 112*e*, 112*f*, 112*g*, 112*h*. The drive motor 113, which is one of these drive motors 113, 114, 115, is fixed to the support column 105*a* so that a rotary shaft of the drive motor 113 can be horizontally supported. The drive motors 114, 115 are fixed to the support column 105*b* so that rotary shafts of the drive motors 114, 115 can be perpendicularly supported.

The pulleys 108*a*, 108*b* are timing pulleys (pulleys having teeth). The pulley 108*a* functioning as a drive pulley is fixed to the rotary shaft of the drive motor 113. The pulley 108*b* functioning as an idle pulley is attached to the support column 105*b* so that a pulley shaft of the pulley 108*b* can be set horizontally with respect to the base 101.

The pulleys 110*a*, 110*c*, 110*e* are timing pulleys (pulleys having teeth). The pulley 110*a*, which is one of these pulleys 110*a*, 110*c*, 110*e*, is fixed to a rotary shaft of the drive motor 114 and functions as a drive pulley. The pulley 110*c* is arranged at a foreword end portion of the extending portion 122*b* of the X-axis plate 122 so that a pulley shaft of the pulley 110*c* can be perpendicular to the base 101. The pulley 110*e* is attached to the support column 105*a* so that a pulley shaft of the pulley 110*e* can be perpendicular to the base 101.

The pulleys 110*b*, 110*d* are pulleys having no teeth. These pulleys 110*b*, 110*d* are arranged in a base end portion 122*a* of the X-axis plate 122 so that pulley shafts of the pulleys 110*b*, 110*d* can be perpendicular to the base 101.

The pulleys 112*a*, 112*b*, 112*e*, 112*g* are timing pulleys (pulleys having teeth). The pulley 112*a*, which is one of these pulleys 112*a*, 112*b*, 112*e*, 112*g*, is fixed to a rotary shaft of the drive motor 115 and functions as a drive pulley. The pulley 112*b* is attached to the support column 105*a* so that a pulley shaft of the pulley 112*b* can be perpendicular to the base 101. The pulley 112*e* is arranged on the feed screw shaft 143. The pulley 112*g* is attached to a pulley support member 122*c*, which is arranged in an upper face foreword end portion of the extending portion 122*b* of the X-axis plate 122, so that a pulley shaft of the pulley 112*g* can be perpendicular to the base 101.

The pulleys 112*c*, 112*d*, 112*f*, 112*h* are pulleys having no teeth. The pulleys 112*d*, 112*f* in these pulleys 112*c*, 112*d*, 112*f*, 112*h* are attached to the Y-axis plate 132 so that pulley shafts of the pulleys 112*d*, 112*f* can be perpendicular to the base 101.

A lower end portion of the pulley support member 126 (shown in FIG. 9) is fixed onto an upper face portion of the base end portion 122*a* of the X-axis plate 122. The pulley support member 126 has a horizontal plate portion 126*a* (shown in FIGS. 4 and 9) which is located above the X-axis belt attaching member 123. In an upper face portion of this horizontal plate portion 126*a*, pulley shafts of the pulleys 112*c*, 112*h* are perpendicularly arranged.

In the above structure, for example, when the drive motors 113, 114, 115 are synchronously driven so as to make the respective timing belts 107, 109, 111 run in a predetermined direction, the member to be driven is moved in the direction of X-axis in the drawing. When the drive motors 114, 115 are synchronously driven so as to make the respective timing belts 109, 111 run in a predetermined direction, the member to be driven is moved in the direction of Y-axis in the drawing. When the drive motor 115 is driven so as to make the timing belt 111 run, the member to be driven is moved in the direction of Z-axis in the drawing.

Accordingly, since the drive motors 113, 114, 115, which are used as a mechanism portion to move the member to be driven in three axial directions of X-axis, Y-axis and Z-axis, are respectively fixed to any of the support columns 105*a* and 105*b* which are not moved, it is unnecessary to provide the Cable Bear. Therefore, at the time of moving the member to be driven in three axial directions, no Cable Bear is dragged. Accordingly, it is possible to suppress generations of noise and dust.

It is unnecessary to mount a drive motor on the slider 131*b* of the Y-direction linear guide 103 or the Z-direction positioning mechanism 104. Therefore, a weight of the Y-direction linear guide 103 or the Z-direction positioning mechanism 104 can be reduced. Due to the reduction of the weight, the member be driven can be moved in the three axial directions at high speed. Accordingly, it is possible to reduce the time necessary for positioning.

Further, since the Z-direction positioning mechanism 104 having the feed screw 143 is used for positioning the member to be positioned in the Z-direction, no pulley is rotated by an inertial force when the drive motor 114 is stopped, which is unlike the structure in which the Z-direction positioning mechanism 104 is provided with a pulley and a timing belt. Accordingly, it is unnecessary to separately provide a brake mechanism.

In the third embodiment described above, the X-direction guide member of the X-direction linear guide 102 and the Y-direction guide member of the Y-direction linear guide 103 are respectively formed out of a guide rail. However, instead of the guide rail, it is possible to use a guide rod.

In the third embodiment, the drive motor 113 for driving the slider drive timing belt 107 is fixed to the support column 105*a*. However, the drive motor 113 may be fixed to the support column 105*b*. Further, the drive motor 114 for driving the slider drive timing belt 109 is fixed to the support column 105*b*. However, the drive motor 114 may be fixed to the support column 105*a*. Furthermore, the drive motor 115 for driving the feed screw shaft drive timing belt 111 is fixed to the support column 105*b*. However, the drive motor 115 may be fixed to the support column 105*a*.

Fourth Embodiment

In the third embodiment described above, the Z-direction positioning mechanism includes: a feed screw shaft 143 perpendicularly supported by the Y-axis plate 132; a nut 144 screwed to the feed screw shaft 143; and a nut support mechanism portion 145 for supporting the nut 144 so that the nut 144 can be moved in the axial direction of the screw shaft 143.

Figure 10:
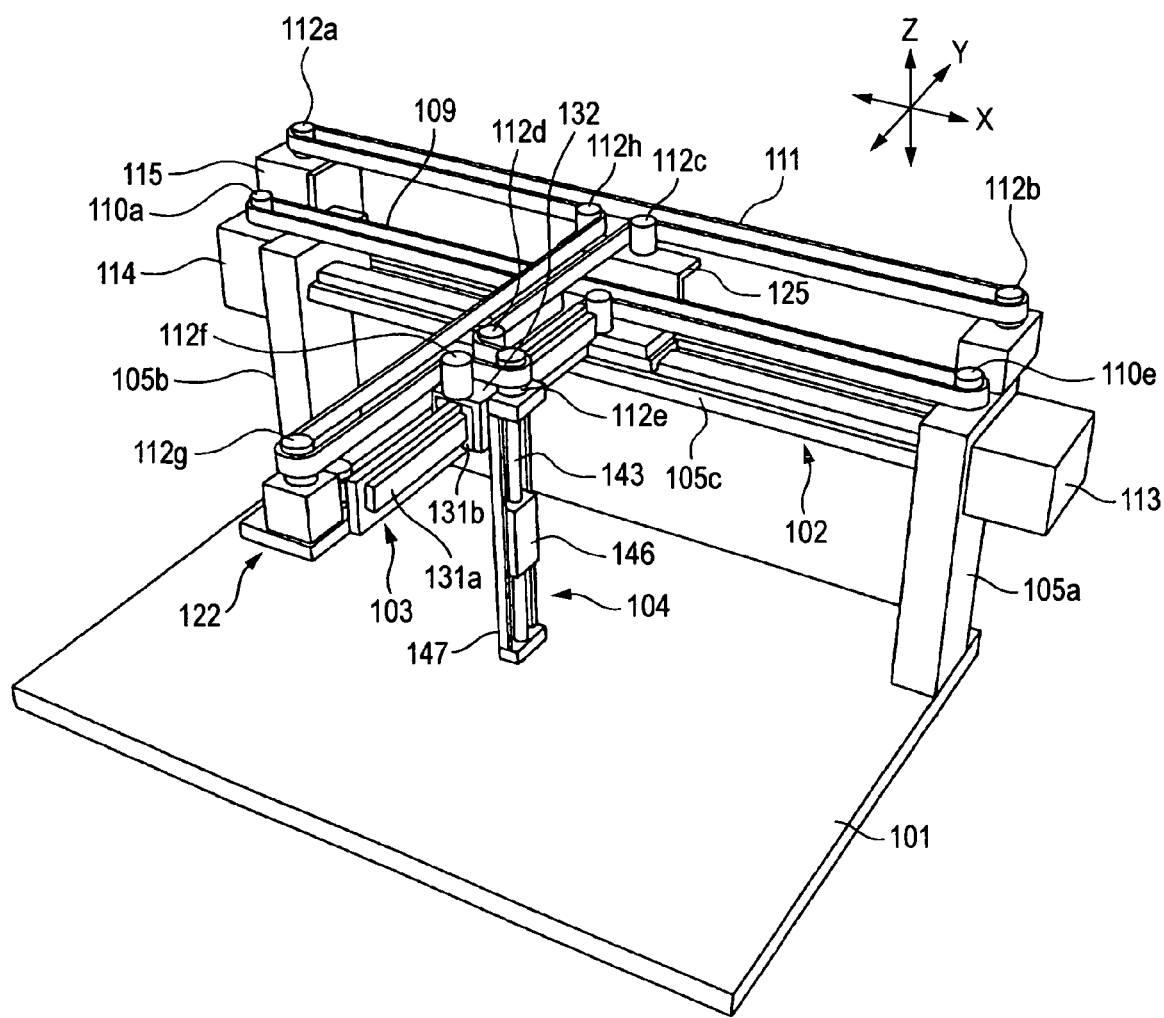
FIG. 10 is a perspective view showing an outline of the structure of the three axis drive unit of the fourth embodiment of the present invention.

However, as shown in a fourth embodiment shown in FIG. 10, the Z-direction positioning mechanism 104 may includes: a feed screw shaft 143 perpendicularly supported by the Y-axis plate 132; a Z-direction slider (movable body) 146 having a nut portion (not shown) screwed to this feed screw shaft 143; and a slider support body (guide rail) 147 for supporting the Z-direction slider 146 so that the Z-direction slider 146 can be moved in the Z-axis direction. In this case, the Z-direction slider 146 or the object to be positioned, which is fixed to the Z-direction slider 146, is a member to be driven.

In this embodiment, rolling elements, such as balls or rollers (not shown) are disposed between the feed screw shaft 143 and the nut portion of the slider 146, and also between the slider 146 and the slider support body 147 so as to allow relative movement each other.

The feed screw shaft 143 is rotated by the transmission belt 111 through the pulley 112*e* arranged on the end portion of the screw shaft 143.

The slider support body 147 guides the Z-direction slider 146 or the object to be positioned in the Z-direction. In this embodiment, the slider support body 147 is provided so as to be parallel to the feed screw shaft 143;

The Z-direction slider 146 moves along with the slider support body 147.

For an example, instead of direct engagement between the feed screw shaft 143 and Z-direction slider 146, when balls may be disposed between the feed screw shaft 143 and the Z-direction slider 146 and between the slider support body 147 and the Z-direction slider 146. According to this structure, relative movement among the feed screw shaft 143 and the Z-direction slider 146 is allowed.

According to the above structure, the Z-direction slider 146 is driven by rotation of the feed screw shaft 143, and guided by the slider support body 147. Thus, the Z-direction slider 146 moves in the Z-direction.

In each embodiment described above, the Z-axis direction is set to be in the perpendicular direction. The X-axis direction and the Y-axis direction, which are perpendicular to the Z-axis direction, are set in the horizontal direction. However, it should be noted that the present invention is not limited to the above specific embodiment. The present invention can be applied even to a case in which the three axial directions are determined in a different manner from that of the case described above.

The structure of the X-direction support portion 50, 60, 105 and that of the Y-direction support portion 5, 125 are not restricted by the structure of each embodiment described above. For example, as long as the X-direction support portion 105 is composed as follows, any structure may be employed. The X-direction support portion 105 is composed so that it can not be relatively moved with respect to the base 101. The X-direction support portion 105 supports the guide rail 121*a*, which is an X-direction guide member, and the drive motors 113 to 115. As long as the Y-direction support portion 125 is composed as follows, any structure may be employed. The Y-direction support portion 125 is provided so that the Y-direction support portion 125 can not be relatively moved with respect to the X-axis sliders 121*b*, 121*c*. The Y-direction support portion 125 supports the guide rail 131*a* which is a Y-direction guide member.

Further, in each embodiment described above, the slider drive transmission belt is formed out of a timing belt, on the inner circumferential face of which teeth are provided. The pulley engaged with the inner circumferential face of the timing belt is formed out of a timing pulley. However, it should be noted that the present invention is not limited to the above specific structure. For example, in the case where there is no possibility of the occurrence of slippage, it is possible to use a combination of a transmission belt having no teeth with a pulley having no teeth. Alternatively, in addition to the inner circumferential face on which teeth are provided, a timing belt, on the outer circumferential face of which teeth are provided, may be used, that is, all the pulleys may be timing pulleys.

Concerning the guide mechanisms, it is possible to use appropriate bearings such as various rolling guide bearings, sliding guide bearings and statistic pressure guide bearings. In the same manner, concerning the feed screw mechanisms, it is possible to use appropriate screw mechanisms such as ball screws, roller screws and slide screws.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A three axis drive apparatus for driving a driven member in first, second and third directions perpendicular to each other, comprising:
   a base comprising a first support portion fixed thereon;
   a first guide mechanism comprising:
      a first guide member supported by the first support portion; and
      a first slider guided by the first guide member in the first direction;
   a second guide mechanism comprising:
      a second guide member extending in the second direction from the first slider; and
      a second slider guided by the second guide member in the second direction;
   a third guide mechanism that is provided on the second slider and guides the driven member to the third direction;
   a first belt drive mechanism comprising:
      a first slider drive transmission belt that slides the first slider; and
      a first motor that drives the first slider drive transmission belt through a plurality of first pulleys;
   a second belt drive mechanism comprising:
      a second slider drive transmission belt that slides the second slider; and
      a second motor that drives the second slider drive transmission belt through a plurality of second pulleys; and
   a driven member drive mechanism comprising:
      at least one of driven member drive transmission belt that slides the driven member; and
      a third motor that drives the driven member in the third direction through a plurality of driven member pulleys,
   wherein the first pulleys, at least one of the second pulleys, at least one of the driven member pulleys, the first motor, the second motor and the third motor are fixed on the first support portion.

2. The three axis drive apparatus, according to claim 1, wherein in the second belt drive mechanism, three pulleys of the second pulleys are supported on the first slider and draw a part of the second belt along with second direction.

3. The three axis drive apparatus, according to claim 1, wherein the driven member drive mechanism further comprises:
   a spline shaft that is supported on the first slider so as to extend in the second direction and is rotated by at least one of the driven member drive transmission belt;

a pair of third pulleys that is rotatably driven by the spline shaft and provided so as to be movable in an axial direction of the spline shaft;

a secondary driven member drive transmission belt that moves the driven member in the third direction by the pair of the third pulleys.

4. The three axis drive apparatus, according to claim 1, wherein the driven member drive mechanism comprises:

a feed screw shaft supported on the second slider so as to extend in the third direction and rotatably driven by the driven member drive transmission belt;

a nut that is connected to the driven member, is screwed to the feed screw shaft and is moved in the third direction by rotation of the feed screw shaft.

5. The three axis drive apparatus, according to claim 4, wherein the driven member drive mechanism comprises:

a second direction drawing pulley that is supported on the first slider and draws a part of the driven member drive transmission belt in the second direction;

three first direction drawing pulleys that are supported on the second slider and draw a part of the driven member slider drive transmission belt in the first direction which is drawn in the second direction by the second direction drawing pulley, wherein one of the first direction drawing pulley, which is engaged with an end part of the driven member drive transmission belt drawn in the first direction, is fixed on the feed screw shaft.

6. The three axis drive apparatus, according to claim 4, wherein the driven member drive mechanism comprises:

a third slider comprising a nut portion screwed on the feed screw shaft, a slider support member that supports the third slider so as to be movable in an axial direction of the feed screw shaft.

7. The three axis drive apparatus, according to claim 1, wherein the third guide mechanism comprising:

a screw shaft rotated by the driven member drive transmission belt;

a movable body engaged with the screw shaft directly or indirectly;

a guide rail that is provided so as to be parallel to the screw shaft and guides the movable body in a longitudinal direction of the guide rail;

wherein the movable body is driven by the screw shaft and guided by the guide rail.

* * * * *